July 26, 1927.
W. WIELAND
FLOATING TRACTOR HITCH
Filed Sept. 8, 1925
1,636,845
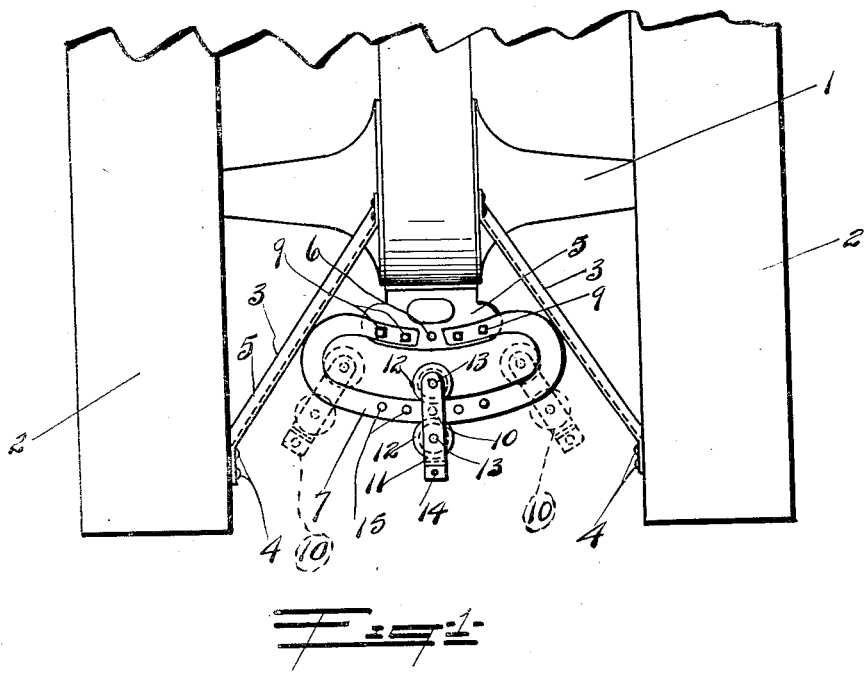
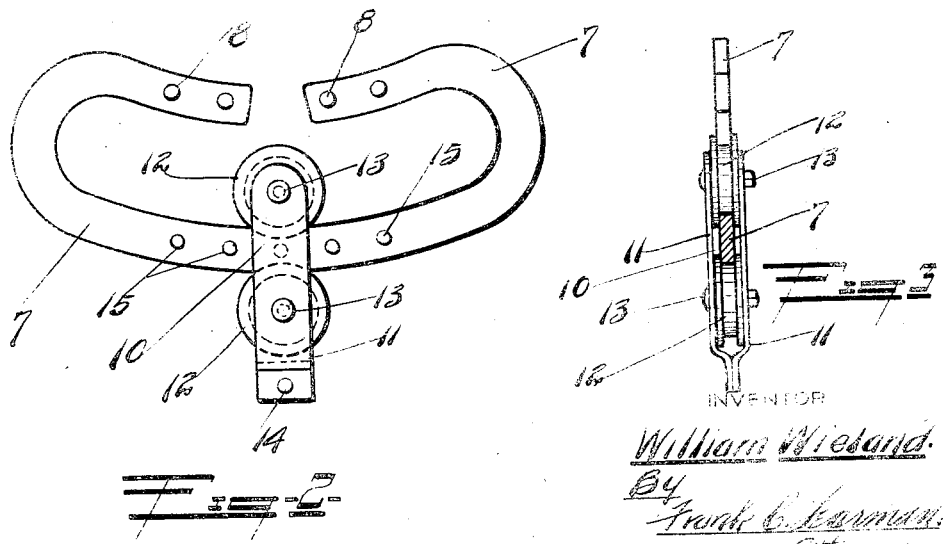

Patented July 26, 1927.

1,636,845

UNITED STATES PATENT OFFICE.

WILLIAM WIELAND, OF BAY CITY, MICHIGAN, ASSIGNOR OF ONE-HALF TO JOHN KOHLER MOHR, OF BAY CITY, MICHIGAN.

FLOATING TRACTOR HITCH.

Application filed September 8, 1925. Serial No. 54,946.

This invention relates to tractor hitches and the like.

One object of the invention is to design a very simple and substantial hitch which can be quickly and easily applied, without changing or removing any portion of the tractor or draw bar proper.

Another object of the invention is to design a hitch which will allow the implement drawn by the tractor to make a sharper turn, and to operate closer to the edges of the field.

A further object is to design a floating hitch which aids in, and makes the steering of the tractor far easier when a harrow or other implement is being drawn.

A still further object is to provide a hitch in which the draw bar pull is shifted when the tractor is turned, permitting the implement to go closer into the corners than is possible when the drawbar pull is fixed.

With the above and other objects in view, the present invention consists in the combination and arrangement of parts, hereinafter more fully described, illustrated in the accompanying drawing, and particularly pointed out in the appended claims, it being understood that changes may be made in the form, size, proportion and minor details of construction, without departing from the spirit or sacrificing any of the advantages of the invention.

In the drawing—

Fig. 1 is a fragmentary top plan view of a tractor showing my improved hitch in place thereon.

Fig. 2 is an enlarged plan view of the hitch proper.

Fig. 3 is a sectional edge view taken on the line 3—3 of Fig. 2.

In order that the advantages secured by use of my improved hitch may be fully understood I shall give you a short résumé of the difficulties encountered in turning a tractor, (and the implement attached thereto), at the ends of the field, and the area of ground that it is impossible to till with the usual attachment.

In conventional tractors the implement is pivotally connected by means of a draw bar or the like to a fixed pivoting point on the tractor proper. The ground being tilled is naturally quite soft, and in turning, the front wheels of the tractor (when an implement is being drawn) skid or slide forward due to the fact that the rear wheels only are driven and the pull of the implement is constant, consequently, before the tractor responds to the steering mechanism, the front end of the tractor hits the fence. It is impossible to back up with an implement attached as above described, therefore the implement must be detached and the tractor turned, thus consuming valuable time, to avoid which the operator starts turning at a distance from the fence or edge of the field, to be certain that the above mentioned happening will not be repeated; therefore a large strip of land next to the fence is not worked or tilled. My improved floating hitch eliminates these objectionable features, as the implement does not turn immediately the tractor wheels are turned, and the angle of draw bar pull is changed when the tractor turns.

Referring now particularly to the drawing the numeral 1 indicates the rear axle of a conventional tractor on which the usual ground engaging wheels are mounted, fenders 2 cover said wheels and braces 3 extend from the rear axle housing to the said fenders, and are secured in position by means of rivets 4 in the usual manner.

The conventional draw bar hitch 5 is attached to the rear axle and is provided with a series of spaced apart openings 6 to which a clevis is attached for hitching the implement thereto.

My improved floating hitch is secured to this member 5 and comprises a flat bar iron 7 curved and rounded as shown, the end being provided with openings 8 for securing the hitch to the member 5 by means of bolts 9.

A trolley 10 is adapted to engage the member 7 and comprises a sheave cage 11 having a pair of spaced apart grooved sheaves 12 mounted therein, these sheaves being revolubly journaled on the pins 13 in the usual manner, the end of the sheave cage being provided with an opening 14 for the attachment of an implement. These sheaves engage the inner and outer edges of this bar iron 7 and float thereon and when the direction of the travel of the tractor is changed, this shifting varies the angle of pull accordingly. When the tractor is turned sharply to the right, the sheave cage rolls to the right hand side of the hitch, the angle of pull on the tractor is thus shifted off center, this shifting together with the angle eases the pull of the implement on the tractor eliminating skidding and allowing the tractor to be easily turned, further, the turning action of the tractor is not immediately communicated to the implement due to the shifting of the sheave cage, this curved track also insures the sheave cage automatically rolling back to central position when the tractor is straightened and traveling straight ahead.

If a floating action is not desired, as when plowing, the trolley is shifted to one side, and the implement attached to one of the openings 15 provided in the bar member 7, these openings being spaced the same as those in the member 5 with which the tractor is originally equipped.

From the foregoing description it will be obvious that I have perfected a very simple, inexpensive and substantial tractor hitch, easy to attach and effective in operation.

What I claim is:—

1. A floating tractor hitch comprising a substantially circular one piece track the ends of which are adapted to be secured directly to a tractor draw-bar and a trolley mounted to float thereon.

2. A floating tractor hitch comprising a circular track, the ends of which return and are adapted to be secured directly to a tractor draw-bar, a sheave cage and sheaves mounted in said cage, and engaging said track to float thereon.

3. A floating tractor hitch comprising a substantially circular track, the ends of which return and are secured to the tractor draw-bar, a sheave cage, grooved sheaves mounted therein and adapted to engage and float on said track, and spaced apart openings in the said track.

4. A floating tractor hitch adapted to be attached to a tractor and comprising a substantially circular track having rounded ends adapted to accommodate a sheave, a sheave cage, grooved sheaves mounted thereon and engaging and floating on said track and spaced apart openings in said track.

In testimony whereof I affix my signature.

WILLIAM WIELAND.